(12) United States Patent
Yang

(10) Patent No.: US 7,428,078 B2
(45) Date of Patent: Sep. 23, 2008

(54) MOVABLE CALIBRATION DEVICE FOR A SHEET-FED SCANNER

(75) Inventor: Chi-Ting Yang, Taiwan (TW)

(73) Assignee: Avision Inc. (TW)

( * ) Notice: Subject to any disclaimer, the term of this patent is extended or adjusted under 35 U.S.C. 154(b) by 564 days.

(21) Appl. No.: 11/118,322

(22) Filed: May 2, 2005

(65) Prior Publication Data

US 2005/0248814 A1 Nov. 10, 2005

(30) Foreign Application Priority Data

May 5, 2004 (TW) .............................. 93112576 A

(51) Int. Cl.
*H04N 1/04* (2006.01)
*H04N 1/40* (2006.01)

(52) U.S. Cl. ...................... 358/461; 358/496; 358/498; 358/406

(58) Field of Classification Search ................. 358/496, 358/498, 461, 406, 504, 474, 471, 505; 250/216, 250/234–236; 382/274, 312, 318, 319; 399/367
See application file for complete search history.

(56) References Cited

U.S. PATENT DOCUMENTS 6,989,915 B2 * 1/2006 Honjo et al. ................. 358/461

* cited by examiner

*Primary Examiner*—Cheukfan Lee

(57) ABSTRACT

A movable calibration device for a sheet-fed scanner includes a calibration sheet and a cam. A scanning module scans an image on the calibration sheet for calibrating the sheet-fed scanner. The cam, driven by a motor, moves the calibration sheet into and out of a scan window of the scanning module. The calibration sheet can be moved out of the scan window without reversing the rotational direction of the motor. The entire calibration sheet is moved in a linear path.

10 Claims, 5 Drawing Sheets

MOVABLE CALIBRATION DEVICE FOR A SHEET-FED SCANNER

BACKGROUND OF THE INVENTION

1. Field of the Invention

The invention relates to a movable calibration device for a sheet-fed scanner, and more particularly to a calibration device including a calibration sheet driven by a cam for the calibration of the sheet-fed scanner.

2. Description of the Related Art

FIGS. 1 and 2 are schematic illustrations showing a prior art calibration device for a sheet-fed scanner. In this calibration device, as shown in FIGS. 1 and 2, a motor 114 rotates a cylinder 112, around which a calibration sheet 116 is wound. When the cylinder 112 is rotated clockwise, the calibration sheet 116 is unrolled and spread out underneath a scanning module 110. When the cylinder 112 is rotated counterclockwise, the calibration sheet 116 is retracted away from the scanning module 110. In order to prevent accumulation of errors during the process, a detector 118 has to be provided to detect whether or not the calibration sheet 116 has been moved away from the scanning module 110.

The conventional calibration utilizes a detector, a reversible motor and a gear set, converting the rotational motion of the cylinder 112 into linear motion, such that the calibration sheet made of Mylar may be moved into the scan window of the scanning module and then away from the scan window after the calibration is completed.

However, because Mylar tends to yield to weight and pressure, the rotational motion cannot be completely converted to the linear motion. Thus, the scanning module may not correctly focus on the calibration sheet, and the results are thus affected. In addition, the structure of this calibration device with the detector and the reversible motor is complicated, and the cost cannot be effectively reduced.

SUMMARY OF THE INVENTION

It is therefore an object of the invention to provide a calibration device including a calibration sheet driven by a cam for the calibration of the sheet-fed scanner, wherein the calibration sheet can be moved out of the scan window of the scanning module without reversing the rotational direction of the motor driving the cam.

To achieve the above-mentioned object, the invention provides a movable calibration device for a sheet-fed scanner. The device includes a calibration sheet and a cam. The scanning module of the sheet-fed scanner scans an image on the calibration sheet for calibration. The cam is driven by a motor to move the calibration sheet into and out of a scan window of the scanning module. The entire calibration sheet is moved in a linear path.

The cam may be a form-closed cam or a force-closed cam. The calibration sheet may be directly in contact with the cam, or mounted on a follower in direct contact with the cam, so that a stable calibration quality may be obtained.

DETAILED DESCRIPTION OF THE INVENTION

Figure 1:
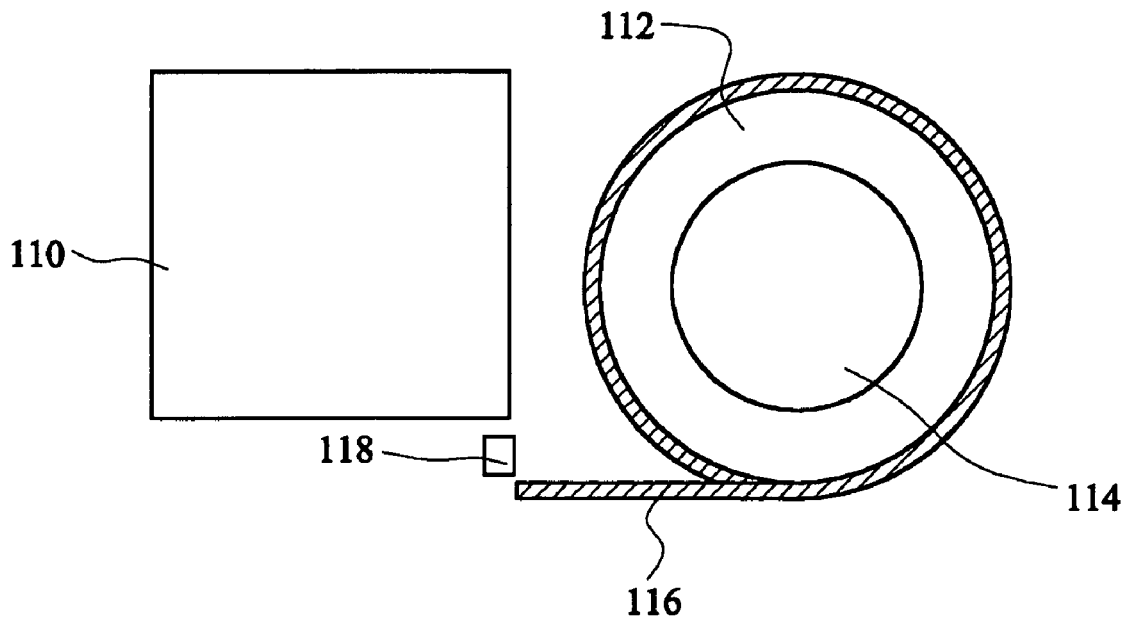
FIGS. 1 and 2 are schematic illustrations showing a prior art calibration device for a sheet-fed scanner.
Figure 2:
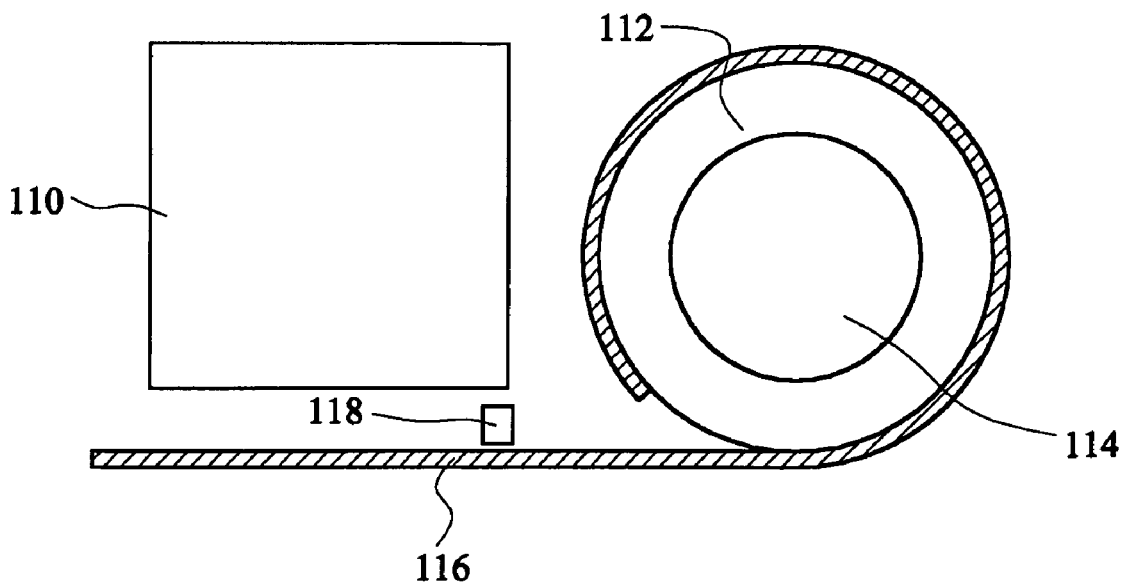
Figure 3:
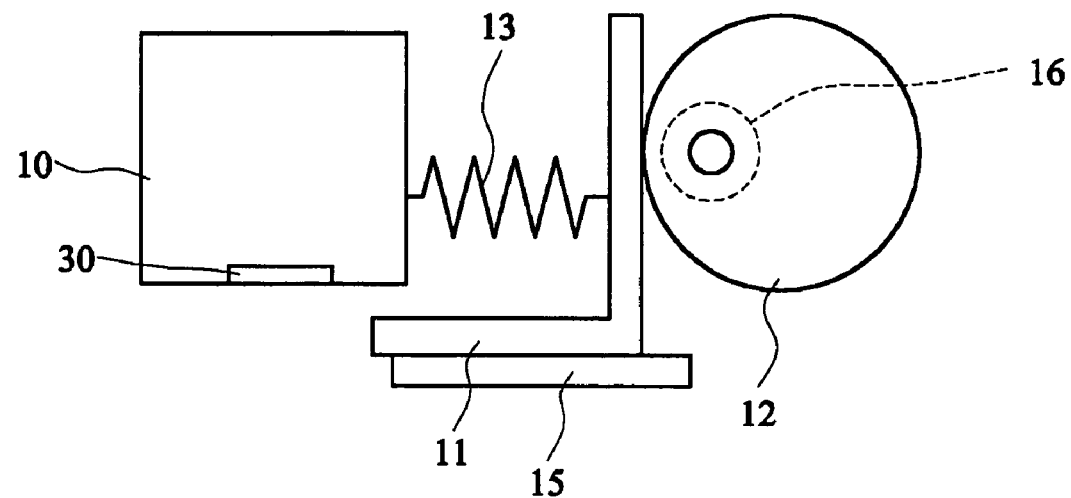
FIGS. 3 and 4 are schematic illustrations showing a movable calibration device for a sheet-fed scanner according to a first embodiment of the invention.
Figure 4:
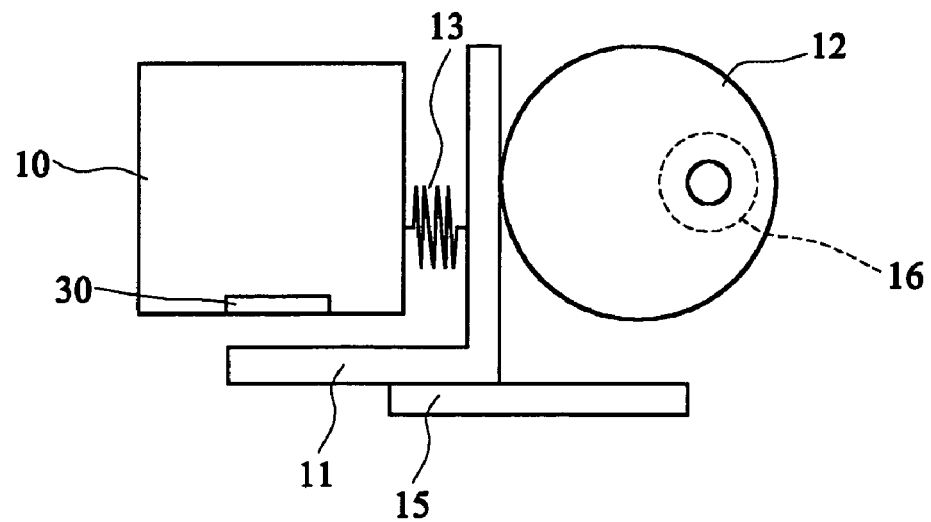

FIGS. 3 and 4 are schematic illustrations showing a movable calibration device for a sheet-fed scanner according to a first embodiment of the invention. As shown in FIG. 3, the movable calibration device for the sheet-fed scanner of this embodiment includes a calibration sheet 11 and a cam 12. A scanning module 10 scans an image on the calibration sheet 11 for calibration. The cam 12 of this embodiment is an eccentric wheel driven by a motor 16 to move the calibration sheet 11 into and out of a scan window 30 of the scanning module 10. The entire calibration sheet 11 is moved in a linear path. The calibration sheet 11 directly in contact with the cam 12 serves as a follower. The cam 12 is a force-closed cam, so an elastic element (e.g., a spring) 13 coupled to the calibration sheet 11 and the scanning module 10 is required. The scanning module 10 is a stationary unit. Thus, when the calibration sheet 11 is moved to a position underneath the scan window 30 of the scanning module 10, the elastic element 13 is compressed to store the energy, such that the elastic element 13 can provide a force for recovering the calibration sheet 11 to the state of FIG. 3 when the calibration sheet 11 is moved out of the scan window.

In other embodiments, the cam 12 may be a form-closed cam, and no elastic element is needed to provide the recovering force.

In order to move the calibration sheet 11 along a single direction stably, the calibration device may further include a guiding structure 15 for guiding the calibration sheet 11 to move in the moving direction.

Figure 5:
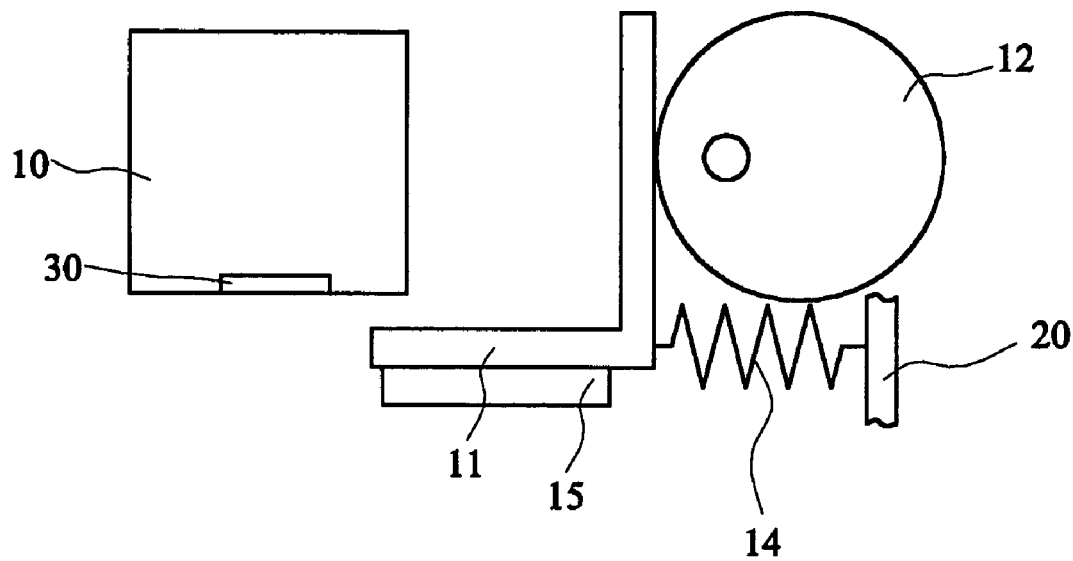
FIGS. 5 and 6 are schematic illustrations showing a movable calibration device for a sheet-fed scanner according to a second embodiment of the invention.
Figure 6:
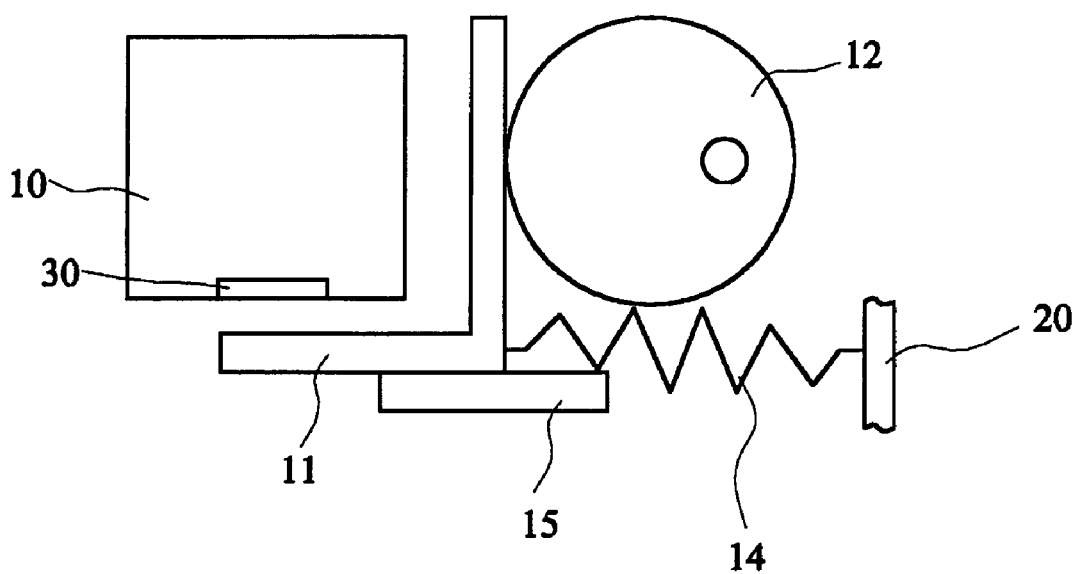

FIGS. 5 and 6 are schematic illustrations showing a movable calibration device for a sheet-fed scanner according to a second embodiment of the invention. This embodiment is similar to the first embodiment except that an elastic element 14 is coupled to the calibration sheet 11 and a housing 20 of the sheet-fed scanner. The housing 20 and the scanning module 10 both are stationary units, so the elastic element 14 can store and release energy such that the calibration sheet 11 can be moved into or out of the scan window.

Figure 7:
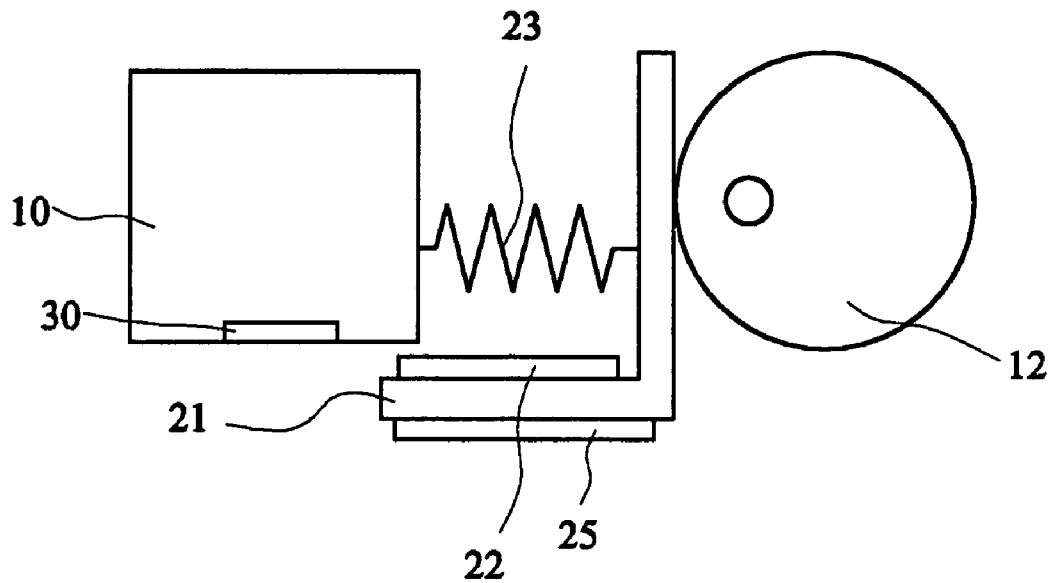
FIGS. 7 and 8 are schematic illustrations showing a movable calibration device for a sheet-fed scanner according to a third embodiment of the invention.
Figure 8:
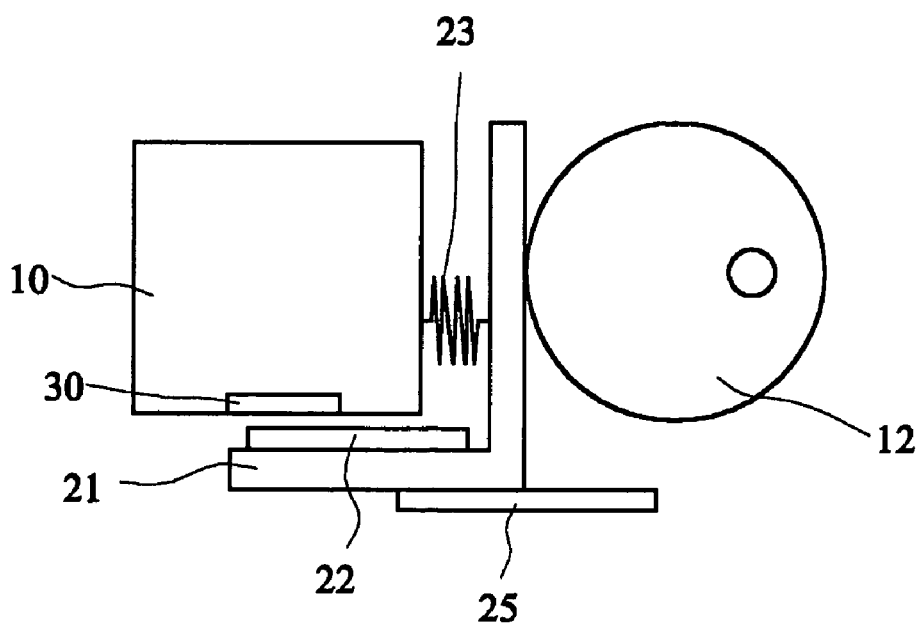

FIGS. 7 and 8 are schematic illustrations showing a movable calibration device for a sheet-fed scanner according to a third embodiment of the invention. This embodiment is similar to the first embodiment except that the calibration device further includes a follower 21 in contact with the cam 12, and a calibration sheet 22 is mounted on the follower 21. An elastic element 23 is coupled to the follower 21 and the scanning module 10. Typically, the calibration sheet is made of Mylar, which is a thin sheet and sometimes cannot provide the sufficient resistance to the pushing and pulling forces of the elastic element 23 and the cam 12. A guiding structure 25 guides the follower 21 to move in a moving direction, and thus guides the calibration sheet 22 to move in the moving direction.

Figure 9:
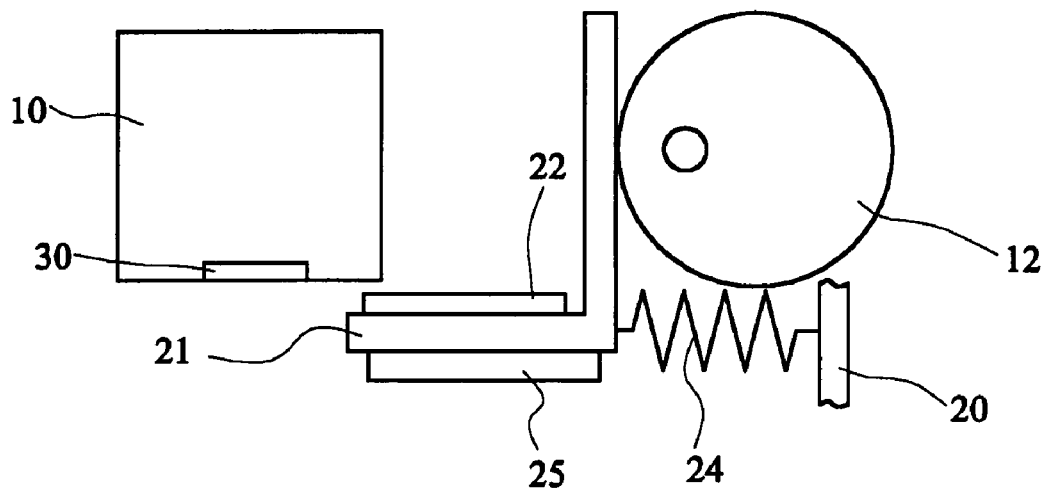
FIGS. 9 and 10 are schematic illustrations showing a movable calibration device for a sheet-fed scanner according to a fourth embodiment of the invention.
Figure 10:
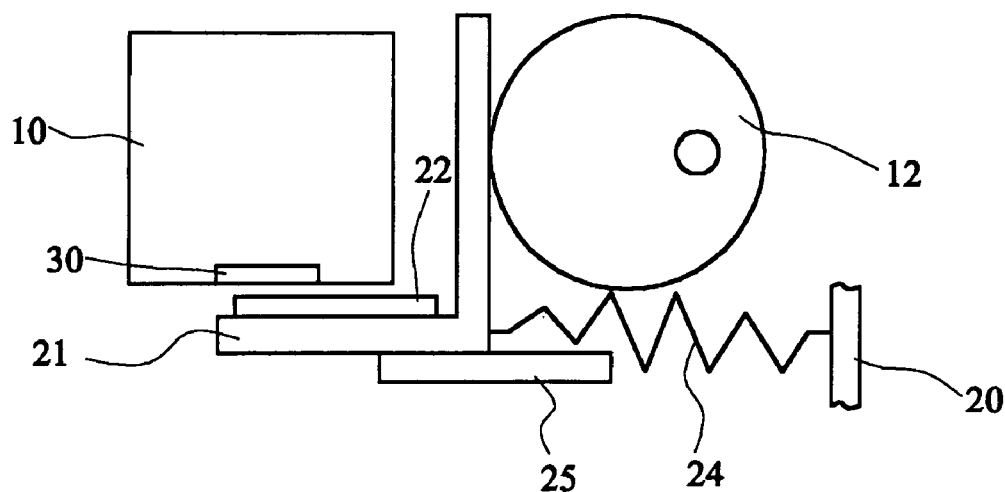

FIGS. 9 and 10 are schematic illustrations showing a movable calibration device for a sheet-fed scanner according to a fourth embodiment of the invention. This embodiment is similar to the third embodiment except that an elastic element 24 is coupled to the follower 21 and a housing 20 of the sheet-fed scanner.

Thus, the invention utilizes the cam to convert the rotational motion into the linear motion so as to ensure the calibration sheet to be correctly focused by the scanning module and thus to obtain the better calibration results. For example, when the cam is rotated from 0 to 180 degrees, the rotational motion of the motor is converted by the cam into the linear motion for pushing the calibration sheet into the scan window. When the cam is rotated from 180 to 360 degrees, the calibration sheet is moved out of the scan window through an elastic recovery force of an elastic element. Consequently, the rotational direction of the motor does not have to be reversed, and no detector has to be used to detect the position of the calibration sheet. Thus, every revolution (360 degrees) of the motor completes the operations of moving the calibration sheet into and out of the scan window, and the device may be used and designed conveniently. Instead of the pliable Mylar, the invention can adopt a hard calibration sheet, and the problem of controlling the prior art Mylar may be overcome.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A movable calibration device for a sheet-fed scanner, the device comprising:

a calibration sheet, wherein a scanning module of the sheet-fed scanner scans an image on the calibration sheet for calibrating the sheet-fed scanner; and a cam driven by a motor for moving the calibration sheet into and out of a scan window of the scanning module, wherein the entire calibration sheet is moved in a linear path.

2. The device according to claim 1, wherein the calibration sheet is directly in contact with the cam.

3. The device according to claim 1, further comprising:

an elastic element coupled to the calibration sheet and the scanning module.

4. The device according to claim 1, further comprising:

an elastic element coupled to the calibration sheet and a housing of the sheet-fed scanner.

5. The device according to claim 1, further comprising:

a guiding structure for guiding the calibration sheet to move in a moving direction.

6. The device according to claim 1, further comprising:

a follower disposed in contact with the cam, wherein the calibration sheet is mounted on the follower.

7. The device according to claim 6, further comprising:

an elastic element coupled to the follower and the scanning module.

8. The device according to claim 6, further comprising:

an elastic element coupled to the follower and a housing of the sheet-fed scanner.

9. The device according to claim 6, further comprising:

a guiding structure for guiding the follower to move in a moving direction.

10. The device according to claim 1, wherein the cam is a form-closed cam.

* * * * *